Patented Jan. 3, 1939

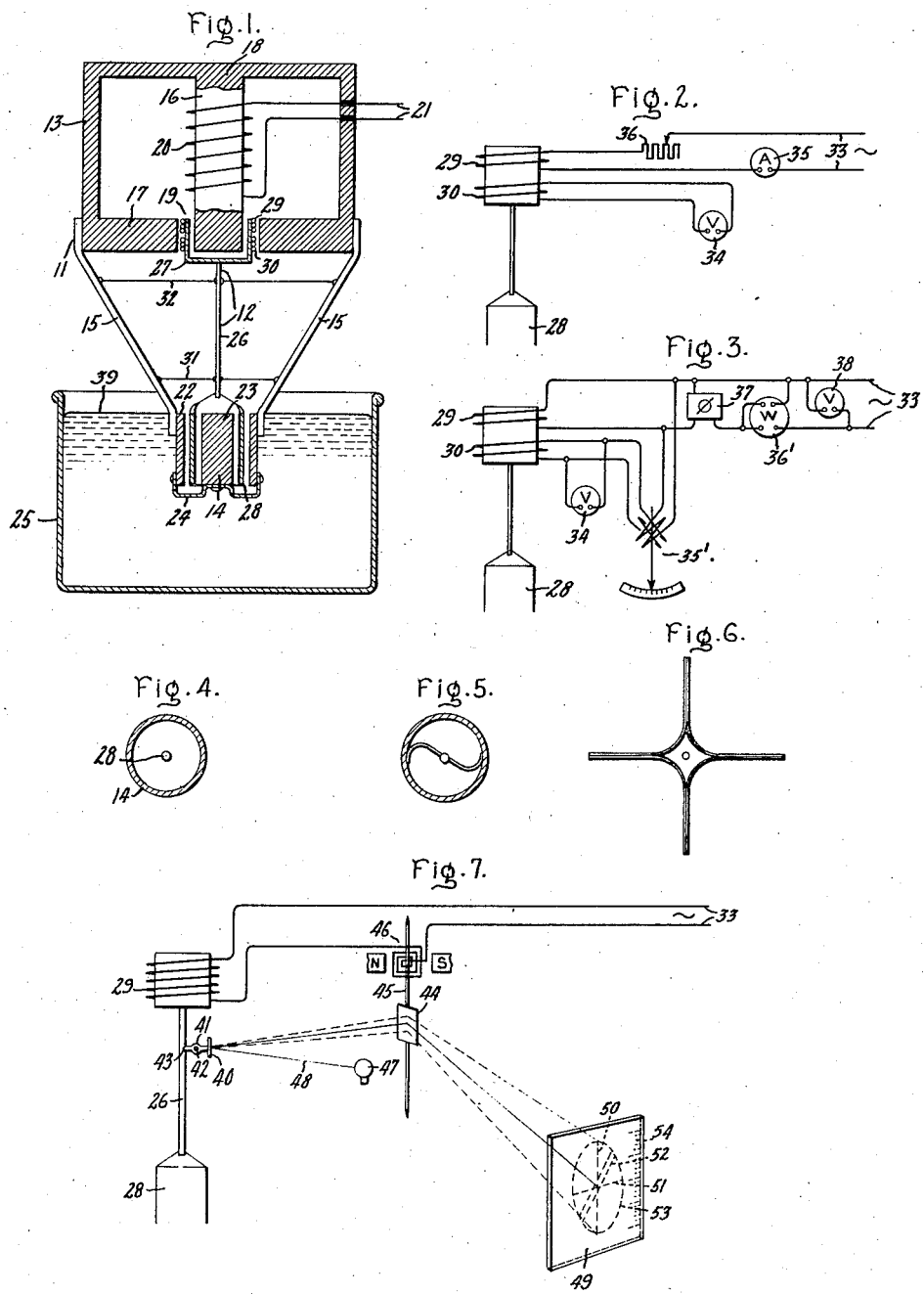

2,142,854

UNITED STATES PATENT OFFICE 2,142,854

VISCOSIMETER

Cramer W. La Pierre, Schenectady, N. Y., assignor to General Electric Company, a corporation of New York Application December 1, 1934, Serial No. 755,642

18 Claims. (Cl. 265—11)

My invention relates to devices responsive to viscosity and arrangements for determining viscosity. The invention has for its principal object the provision of a viscosity measuring arrangement producing a continuous reading rather than one in which the operation must be intermittent, and determinations can be made only periodically by successive repetitions of a predetermined sequence of operations.

It has been found that the time required for a liquid to flow through an orifice or a tube becomes longer as the liquid becomes more viscous. It has also been found that the drag on an object moved through a liquid at a given speed, or the length of time required to move the object through the liquid by the application of a given force becomes greater as the liquid becomes more viscous. However, these methods of determining viscosity do not permit of obtaining continuous direct indications since they depend on measuring time periods. Furthermore, it is extremely difficult, and sometimes impossible, to calculate the absolute value of viscosity in terms of the readings taken and the constants and dimensions of the apparatus. Apparatus for carrying out these methods must therefore be calibrated in arbitrary scales, having no direct relationship with other physical quantities.

The viscosity of a substance is defined as the property of a substance producing resistance to change of form of the substance. The term is usually, but not necessarily, applied to liquids. Mathematically, viscosity may be defined as the quotient of shearing force per unit area divided by rate of variation of velocity with respect to distance along a perpendicular to the plane at and along which the shearing force is measured. In terms of unit quantities, the mathematical concept of viscosity is—force per unit area per unit velocity per unit distance from a surface at which velocity is zero. It is an object of my invention to produce a viscosity measuring arrangement in which the measurement obtained is more nearly in accord with the definition. Other and further objects and advantages will become apparent as the description proceeds.

In carrying out my invention in its preferred form, I provide a plunger suitable for immersion in a substance, the viscosity of which is to be determined, means for vibrating the plunger in a direction parallel with its principal surfaces, and means for comparing the amplitude of vibration with the force or energy applied to the plunger to keep it in vibration. Preferably a stationary member coming in close proximity to the immersed surfaces of the plunger is also provided to protect it and in order to prevent transmission of energy to the entire body of liquid being tested.

The features of my invention which I believe to be novel and patentable will be pointed out in the claims appended hereto. A better understanding of my invention may be obtained by referring to the following description taken in connection with the accompanying drawing, in which Fig. 1 represents schematically one embodiment of my invention, Fig. 2 is a diagram of an electrical circuit which may be used in the arrangement of Fig. 1, Fig. 3 is a modified circuit diagram, Figs. 4, 5, and 6 represent modified forms of plungers which may be employed in connection with apparatus similar to that of Fig. 1, and Fig. 7 represents an embodiment using a modified method of indication.

Referring now more in detail to the drawing, in which like reference characters are used to designate like parts throughout, the apparatus illustrated in Fig. 1 consists of relatively movable members, one of which is referred to for the sake of identification as the stationary member 11 and the other as the movable member 12, although the entire apparatus may be and preferably is portable. The stationary member 11 includes a field structure 13 and a plunger protecting member 14 attached to the field structure by tie-rods 15.

The field structure 13 comprises a center leg 16 and a magnetic return portion 17 in the shape of a hollowed-out cylinder, joining one end of the center leg at 18 but spaced from and surrounding the other end of the center leg 16 to form an annular air gap 19. The field structure 13 is magnetized to produce a magnetic pole at the lower end of the center leg 16 and an opposite magnetic pole in the adjacent surrounding annular portion of the magnetic return 17. In this way, radial flux lines are produced across the annular air gap 19. The field structure 13 either may be permanently magnetized or may be magnetized by means of an electrical winding 20 surrounding the center leg 16 and connected to a suitable source of direct current 21.

The plunger protecting member 14 consists of a hollow cylinder 22 surrounding a cylinder 23 with a concentric annular space therebetween. The cylinders 22 and 23 may be fastened together in any suitable manner as by means of a strap 24. It is convenient to provide a liquid-containing receptacle 25 of sufficient size to receive the plunger protecting member 14 and to permit immersion thereof below the level of the liquid to be tested.

The movable member 12 consists of a rod 26 carrying at opposite ends a non-magnetic shell or spool 27 and a hollow cylindrical plunger 28 both of which are coaxial with the rod 26. The shell 27 carries a pair of current conducting coils, a driving coil 29 and a measuring or detecting coil 30. Preferably the movable member 12 is mounted for axial movement by means of a frictionless suspension such as a plurality of wires or filaments at 31 and 32 attached to the rod 26 near its ends and to a suitable portion of the stationary member 11, e. g., to the tie-rods 15. Consequently, the coils 29 and 30 are free to vibrate axially in the annular magnetic field 19, and the plunger 28 is free to vibrate axially in the annular space between cylinders 22 and 23. Preferably the movable member is made as light as possible to increase the sensitivity of the apparatus. Although for the sake of compactness, the coils 29 and 30 are mounted together and cooperate with the same magnetic field, it will be understood that my invention is not limited to this arrangement and obviously includes an arrangement in which the coils are mounted in air gaps in separate field structures.

The driving coil 29 is connected to a source of alternating current 33 (Figs. 2 and 3) to apply an alternating or a sinusoidal force to the movable member 12, producing axial oscillation of the movable member 12, and the measuring coil 30 is connected to a suitable electric measuring instrument. Although the electrical measuring circuits may be arranged in different ways, I have found a satisfactory arrangement to be that illustrated in Fig. 2. In that arrangement an alternating-current voltmeter 34 is connected to the measuring coil 30 to give comparative indications of the vibration velocity of the plunger 28, and an ammeter 35 and a rheostat 36 are connected in series with the alternating current source 33 to permit maintaining a substantially constant input to the driving coil 29. If the source 33 tends to vary in voltage, it may be desirable to employ a voltage ratio meter 35', connected to measure the ratio of input and output voltages as shown in Fig. 3 instead of employing the voltmeter 34. Since variations in viscosity of the liquid tested produce variations in load in the vibrating system, I have found that viscosity indication may also be obtained by connecting a wattmeter 36' or a power factor or phasemeter 37 in circuit with the source 33 and the driving coil 29. In either case, it is desirable to provide also a voltmeter 38, for checking input voltages.

In measuring viscosity by means of the device, the plunger and plunger protecting member are immersed in the liquid to be tested and the indication is observed that is obtained when the plunger is caused to vibrate. Preferably the top edges of the plunger and plunger protecting member 14 are held substantially at or just below the surface 39 of the liquid to be tested in order to avoid variation in the effective surface area of the plunger 28. The greater the viscosity of the liquid being tested, the greater is the resistance to the motion of the plunger 28, the less is its velocity, the less is the amplitude of vibration, and the less is the voltage generated by the measuring coil 30 for a given electrical input. Inasmuch as alternating-current indicating instruments indicate root-mean-square values, the vibration velocity, displacement, applied sinusoidal force, etc., may be thought of in terms of their root-mean-square values although, of course, the maximum values, instantaneous values at a particular instant in the sinusoidal wave, or other characteristic values may readily be ascertained from the root-mean-square values.

I prefer to consider the operation in terms of the vibration velocity of the moving member 12 because the resistance of the liquid to motion of the plunger 28 and the voltage induced in the measuring coil 30 depend upon the velocity of the plunger and of the measuring coil respectively. For any given frequency of vibration, the amplitude of vibration is, of course, a function of the vibration velocity, so that the amplitude of vibration will also decrease as the viscosity of the liquid increases; and in some applications it may be preferable to provide an indicating arrangement directly responsive to amplitude rather than vibration velocity.

In practice, my device may be calibrated by tests on various liquids having known viscosities. It is apparent, however, that the constant of the apparatus, that is, the relationship between absolute viscosity of the substance tested and the indication obtained can be calculated from the physical dimensions of the apparatus. For example, in the arrangement of Figs. 1 and 2, for a given current in windings 20 and 29, a sinusoidal force of perfectly definite value is produced. The area of the plunger 28 and the distances between the surfaces of the plunger 28 and the adjacent stationary surfaces of the plunger protective member 14 are likewise measurable. I realize that it will be necessary to make corrections for discontinuity produced at the ends of the plunger 28, as well as for unavoidable friction, inertia of the moving portion of the liquid, and other unavoidable extraneous factors. These extraneous factors are, however, reduced to a minimum by my design. It is evident that my apparatus permits taking into consideration all the factors in the theoretical definition of viscosity; viz., force, area of the film parallel to the direction of motion, velocity, and distance to a stationary film measured along a perpendicular to the direction of motion. As previously stated, viscosity is defined as force per unit area divided by the rate of variation of velocity along a perpendicular to the direction of motion. Despite corrections which may be necessary in deriving the constant of the apparatus from its physical dimensions, I believe my apparatus permits measuring the pertinent dimensions more accurately than in apparatus heretofore available. Furthermore, the operation is believed to be more reliable and the indications more significant, because the indications bear a direct relationship to absolute viscosity rather than an obscure, if any, relationship.

The member 14 serves not only to protect the plunger 28 but also to make the annuli of liquid subjected to force very thin. In this way, errors due to inertia of the moving portion of the liquid are minimized as well as any errors which might result in case of non-uniformity in the transmission of force through the molecules of the liquid. In other words, turbulence is minimized and theoretical stream line action substantially obtained. The plunger 28 subjects the adjacent film of liquid to shearing force rather than compression or tension and the plunger protecting member 14, by isolating the moving portion of liquid from the main body of liquid also tends to prevent loss of energy by transmission of pressure waves to the main body of liquid. Nevertheless, my invention is not limited to the precise form of plunger disclosed in Fig. 1. It will be observed also that the construction is such that the distance through which the plunger 28 vibrates is considerably less than the length of the lateral surfaces of the plunger 28 and of the plunger-protecting member 14; consequently, the parallel films of material between the plunger and protector surfaces tend to remain intact, these surfaces and the substances tested are not dragged apart, and turbulence is prevented. In other words, substantially the same films of tested substance remain between the relatively oscillating surfaces.

In the case of more viscous liquids, for example, a single rod 28 surrounded, if desired, by a stationary protecting member 14, may be employed as shown in cross-section in Fig. 4. I have found also that satisfactory results in ordinary cases may be obtained without a protecting member 14. This may be due to the fact that, at the frequency employed, the inertia of the liquid is high enough to cause the liquid to remain stationary at a short distance from the plunger 28 and to act as if the protecting member 14 were present. Other forms of plungers which may be employed are illustrated in Figs. 5 and 6, which are, respectively, a cross-sectional view and an end view.

Determining viscosity by observing the deflection of the voltmeter 34, while holding the applied force constant by means of the ammeter 35 or vice-versa has the advantage that the indication obtained bears a readily discernible relationship to the factors mentioned in the definition of viscosity. However, other manifestations of the variation in viscosity may also be employed to obtain a measurement of viscosity, and other functions of the applied force and of the oscillatory displacement may be measured. For example, increasing viscosity results in increasing the load on the moving system and the amount of energy dissipated in friction between the internal particles of the liquid. The increased energy must be supplied by the source of alternating current 33 and is measured by the wattmeter 36'. Consequently, the reading of wattmeter 36' varies with variations in viscosity. Viscosity variations increasing the work done by the circuit 33 also increase its power factor, so that a power factor meter 37 connected in the circuit may also be calibrated in terms of viscosity.

The viscosity may be measured by determining the phase displacement between the alternating driving force and the resulting vibration of the plunger. As stated in the previous paragraph, an indication of this phase displacement may be obtained by measuring the phase of the input current to the driving coil 29. More direct means of measuring a phase displacement between the alternating driving force and the resulting vibration may also be employed. Any suitable means may be employed, such as an alternating-current bridge arrangement for measuring the phase displacement electrically, or a light beam and a set of mirrors for measuring the displacement optically.

For example, in the arrangement of Fig. 7, a movable mirror 40 may be provided, mounted upon a member 41, pivoted at 42, and engaging a notch 43 in the rod 26 carrying the driving coil 29 of the plunger 28. The vertical vibration of the plunger 28 obviously results in angular oscillation of the mirror 40. A second mirror 44 is also provided, which is mounted on the suspension filament 45 of a vibration galvanometer 46 connected in series with the driving coil 29. A source of light 47 produces a light beam 48, which is reflected by the mirrors 40 and 44 upon a suitable screen 49.

If the vibration galvanometer mirror 44 were to remain stationary while the plunger 28 vibrated, the beam of light would be deflected vertically along the screen 49 to produce the vertical line of light 50. On the other hand, if the mirror 40 were to remain stationary while the mirror 44 vibrated in response to alternations of current in the driving coil 29, a horizontal line of light 51 would be produced on the screen 49. If both mirrors 40 and 44 are in service while the test is being made, the light beam is influenced by the vibration of both mirrors and an oblique line of light 52, or a curved figure such as an ellipse 53, depending on the phase relationship, is produced on the screen 49. The nature of the light figure 52 or 53 will then serve as an indication of the phase relationship between the current in or the driving force of the driving coil 29 and the vibration of the plunger 28. A simple graphic indication of viscosity is thereby obtained.

Fig. 7 illustrates also an optical arrangement for measuring the amplitude of vibration of the plunger 28. If the galvanometer 46 is disconnected, the light beam will vibrate along the vertical line 50 and the length of the line 50, shown as a dotted line, will serve as indication of the amplitude of vibration of the plunger 28. A scale 54 may be provided for this measurement.

I have herein shown and particularly described certain embodiments of my invention and certain methods of operation embraced therein for the purpose of explaining its principle and showing its application but it will be obvious to those skilled in the art that many modifications and variations are possible and I aim therefore, to cover all such modifications and variations as fall within the scope of my invention which is defined in the appended claims.

What I claim as new and desire to secure by Letters Patent of the United States is:

1. A viscosimeter comprising in combination a stationary member including a magnetized field structure and an extension carrying a plunger protecting member adapted for immersion in a substance, the viscosity of which is to be determined, an axially movable member mounted in said stationary member, said movable member including a driving coil and a detecting coil coaxial therewith and in inductive relation with said field structure and a coaxial hollow cylindrical plunger, a source of alternating current connected to said driving coil, and a measuring instrument connected to said detecting coil, said plunger protecting member comprising a hollow cylinder concentrically surrounding said cylindrical plunger and an inner cylinder concentrically surrounded by said cylindrical plunger.

2. A viscosimeter comprising in combination a magnetized field structure, an axially movable member including a driving coil, a detecting coil and a hollow cylindrical plunger, all coaxially arranged, a source of alternating current connected to said driving coil and a measuring instrument connected to said detecting coil, said coils being in inductive relation with said field structure and said plunger being adapted to be immersed in a liquid the viscosity of which is to be determined.

3. A viscosimeter comprising in combination an axially movable member carrying a plunger, a stationary member including a plunger protecting member having surfaces spaced from and substantially parallel to the lateral surfaces of said plunger to receive therebetween a substance, the viscosity of which is to be determined, means for applying to said movable member a sinusoidal force acting parallel to said lateral surfaces, and means responsive to the vibration velocity of said movable member.

4. A viscosimeter comprising in combination a magnetized field structure, an axially movable member including a driving coil and a detecting coil, both coaxially arranged, and a plunger, a source of alternating current connected to said driving coil and a measuring instrument connected to said detecting coil, said coils being in inductive relation to said field structure and said plunger having surfaces parallel with its line of motion and adapted to be immersed in a substance the viscosity of which is to be determined.

5. A viscosimeter comprising in combination, a magnetized field structure, an axially movable member including a detecting coil cooperating with said field structure and a plunger adapted to be immersed in a substance, the viscosity of which is to be determined, means for vibrating said movable member axially, and a measuring instrument connected to said detecting coil.

6. A viscosimeter comprising in combination a magnetized field structure, an axially movable member, including a driving coil and a plunger, a source of alternating current connected to said driving coil, an electrical instrument in circuit therewith responsive to variations in the power component of current supplied to said driving coil, said coil being in inductive relation with said field structure and said plunger having surfaces parallel with its line of motion and adapted to be immersed in a substance, the viscosity of which is to be determined.

7. A viscosimeter comprising in combination, a magnetized field structure, an axially movable member including a driving coil and a plunger, a source of alternating current connected to said driving coil, and means responsive to the amplitude of vibration of said movable member, said driving coil being in inductive relation with said field structure and said plunger being adapted to be immersed in a liquid, the viscosity of which is to be determined.

8. A viscosimeter comprising in combination a plunger having surfaces formed by elements parallel to a given line, means for vibrating said plunger in a substance the viscosity of which is to be determined, along a line parallel to said given line, a deflectible mirror mechanically connected to said plunger so as to be deflected in response to movement of said plunger, means for directing a beam of light upon said mirror, and means for deflecting said beam transversely in response to instantaneous values of a function of force acting upon said plunger.

9. A viscosimeter comprising in combination, a magnetized field structure, an axially movable member including a driving coil and a plunger, a source of alternating current connected to said driving coil, a vibration galvanometer having a movable element carrying a mirror and having a current-conducting coil in series with said driving coil and source of alternating current, a second movable mirror mechanically connected to said axially movable member, an optical screen, and a source of light arranged to project a light beam upon the surface of one of said mirrors, the other mirror having a deflection axis transverse to that of the first and being arranged so that the reflected beam is again reflected and the screen being arranged to have the second reflected beam projected against it, whereby the second reflected beam is deflected along transverse axes in accordance with the oscillations of said mirrors and the nature of the light figure produced is dependent upon the phase relationship between the driving force acting on the movable plunger and the motion thereof.

10. A viscosimeter comprising in combination, a plunger formed from a sheet having surfaces with their elements parallel to a given line, means for applying to said plunger a sinusoidal force parallel to said given line, and means responsive to a function of the oscillatory displacement of said plunger, said plunger being adapted to be immersed in a substance, the viscosity of which is to be determined.

11. A viscosimeter comprising in combination an axially movable member carrying a plunger, a stationary member including a plunger protecting member having surfaces spaced from and substantially parallel to the lateral surfaces of said plunger to receive therebetween a substance, the viscosity of which is to be determined, means for applying to said movable member a sinusoidal force acting parallel to said lateral surfaces, said force having such a magnitude and such a period as to vibrate said plunger through a distance less than the length of the said surfaces, the amplitude of the vibration of the plunger varying with the viscosity of the substance under test, and means responsive to variations in the motion of said movable member.

12. A viscosimeter comprising in combination an axially movable member carrying a plunger, a stationary member including a plunger protecting member having surfaces spaced from and substantially parallel to the lateral surfaces of said plunger to receive therebetween a substance, the viscosity of which is to be determined, means for appplying to said movable member a sinusoidal force acting parallel to said lateral surfaces, said sinusoidal force having such a magnitude and such a period as to vibrate said plunger through a distance less than the length of said surfaces, the resistance offered by the substances under test varying with its viscosity, and means responsive to variations in the resistance offered to motion of said movable member.

13. A viscosimeter comprising in combination a pair of relatively movable members having substantially parallel surfaces, spaced apart to receive therebetween a substance, the viscosity of which is to be determined, means for setting up between said members a sinusoidal force acting parallel to said surfaces, said sinusoidal force having such a magnitude and such a period as to displace said members relatively through a distance less than the length of the surfaces of said members, the magnitude of vibration varying with the resistance offered by the substance under test, and means responsive to the magnitude of the relative motion of said members.

14. A viscosimeter comprising in combination a pair of relatively movable members having substantially parallel surfaces, spaced apart to receive therebetween a substance, the viscosity of which is to be determined, means for setting up between said members a sinusoidal force acting parallel to said surfaces and having such a magnitude and such a period as to displace said members relatively through a distance less than the length of said surfaces, the resistance offered by the substance under test varying with its viscosity, and means responsive to variation in the resistance offered to relative motion of said members.

15. A viscosimeter comprising in combination a pair of relatively movable members having substantially parallel surfaces spaced apart to receive therebetween a substance, the viscosity of which is to be determined, means for setting up between said members a sinusoidal force of a predetermined root-mean-square value, acting parallel to said surfaces, and having such a magnitude and such a period as to displace said members relatively through a distance less than the length of said surfaces, the magnitude of vibrations varying with the resistance offered by the substance under test, and means responsive to the amplitude of the vibration.

16. A viscosimeter comprising in combination, a plunger having surfaces formed by elements parallel to a given line, means for applying to said plunger a sinusoidal force of a predetermined root-mean-square value and acting parallel to said given line, said sinusoidal force having such a magnitude and such a period as to vibrate said plunger through a distance less than the length of said surfaces, the magnitude of the vibration varying with the resistance offered by the substance under test, and means responsive to the amplitude of vibration of said plunger, said plunger being adapted to be immersed in a substance, the viscosity of which is to be determined.

17. A viscosimeter comprising in combination a pair of relatively movable members having substantially parallel surfaces spaced apart to receive therebetween a substance, the viscosity of which is to be determined, means for setting up a sinusoidal force between said members parallel to said parallel surfaces, said sinusoidal force having such a magnitude and such a period as to displace said members through a distance less than length of said surfaces, the magnitude of displacement varying with the resistance offered by the substance under test, and means responsive to variations in the relationship between the relative oscillatory motion of said members and said applied force.

18. A viscosimeter comprising in combination, a plunger having surfaces formed by elements parallel to a given line, means for applying sinusoidal force to said plunger for oscillating the same along a line parallel to given line, said sinusoidal force having such a magnitude and such a period as to vibrate said plunger through a distance less than the length of said surfaces, the magnitude of vibration varying with the resistance offered by the substance under test, and means responsive to variations in the relationship between the oscillatory motion of said plunger and said applied force, said plunger being adapted to be immersed in a substance the viscosity of which is to be determined.

CRAMER W. LA PIERRE.